United States Patent Office 2,701,240
Patented Feb. 1, 1955

2,701,240

DIATOMACEOUS EARTH PRODUCT AND
METHOD FOR ITS MANUFACTURE

George W. Bregar, Torrance, Calif., assignor to Great
Lakes Carbon Corp., New York, N. Y., a corporation
of Delaware No Drawing. Application June 7, 1951,
Serial No. 230,442

13 Claims. (Cl. 252—450)

This invention relates to novel diatomaceous earth products and the methods for manufacturing such products. More particularly, this invention relates to the manufacture of filteraids from diatomaceous earth, said filteraids having improved properties with respect to water solubility and acid solubility and which contain a minimum of non siliceous impurities.

This application is a continuation-in-part of my copending application Ser. No. 162,601 filed May 17, 1950, and now abandoned entitled "Beneficiation of Siliceous Materials."

In the clarification and filtration of industrial liquors, a universally employed filtering agent consists of diatomaceous earth, also referred to as infusorial earth and kieselguhr. In certain applications, the raw material may be used directly after preliminary drying and air classification, but in the majority of cases the diatomaceous earth will be calcined at elevated temperatures often in the presence of a fluxing agent. For example, it has been found useful to heat diatomaceous earth to temperatures in the neighborhood of 1500° to 1800° F. and preferably in the presence of small amount of alkali metal salts such as sodium chloride, soda ash, sodium silicate, etc. It has been stated that advantages attendant flux calcination include agglomeration of the ultra fine particles of diatomaceous silica or other materials present in the raw earth and the resulting formation of coherent aggregates having a larger particle size. This is said to result in a filtration agent having improved flow rate since the ultra fine particles present in raw diatomaceous earth often tend to clog the filter media employed in filtration. Incidentally, the fluxing operation serves to whiten the raw earth which will usually contain impurities such as compounds of iron, aluminum, calcium, and magnesium. It is believed that the iron impurities contribute the major portion of the undesirable color bodies in many diatomaceous earths and that the flux calcining operation in some manner causes a reaction between the fluxing agent, silica, and the color bodies. While whitening of the diatomaceous earth is not essential for improving filtering characteristics, it is sometimes desirable when the resulting diatomaceous earth is to be used as a filler or as an abrasive. Furthermore, certain filteraid consumers prefer a filteraid having a high degree of whiteness as well as good clarifying power, and it has not been feasible up to the present time to prepare such premium products from diatomaceous earth containing extensive amounts of impurities, particularly compounds of iron.

It has been found that a desirable flux calcining operation carried out with the aforementioned agents is only possible when the impurities in the diatomaceous earth are of a low value, more particularly when the iron content thereof (calculated as $Fe_2O_3$) is less than about 2 to 3% by weight. Such diatomaceous earths may be whitened by calcination in the presence of up to about 8% by weight of soda ash or other alkali metal salts of the type previously mentioned. Even here in some cases it has been found impossible to whiten the diatomaceous earth to the desired degree while maintaining a product substantially free from sintered or fritted silica. Oftentimes, the calcined material is pink or red in color, indicating an incomplete whitening or attack upon the color bodies. It has been found to be disadvantageous to employ the aforementioned fluxing agents in amounts higher than about 8% by weight for the reason that under such conditions the resulting product will contain substantial amounts of fused or sintered siliceous material which is formed under the obtaining calcining conditions. While the presence of sintered material may not be objectionable in certain applications such as fillers, their presence in filtering agents is decidedly disadvantageous in that the clarity of the resulting filtrate is impaired.

The exact nature of the iron and aluminum compounds in diatomaceous earths and related materials is not understood with particularity. Several theories have been advanced including the existence of the iron and aluminum in the earth as oxides, i. e. $Fe_2O_3$ and $Al_2O_3$. However, up to the present time neither chemical nor physical methods and analyses have definitely established the nature of these impurities. The preference by many consumers in the trade for a filteraid having a high degree of whiteness has necessitated the selection of crude material having a comparatively low iron content in order that a light colored product free from sintered diatoms may be made available to such users. This has relegated the more impure diatomaceous earths to the field of lower premium products and to applications which are less attractive from a commercial standpoint.

Many liquids which require filtration with diatomaceous earth filteraids must be maintained so that no marked increase in contamination, for example with metal ions, shall occur. In such cases, it is necessary to employ a filteraid having a minimum of water-soluble and acid-soluble material, for example, as in the filtration of many solutions of pharmaceutical chemicals as well as other materials such as mineral or organic acids of high purity (U. S. P., or C. P.), wines and agar solutions, etc. In the past it has been the practice of the industry to manufacture diatomaceous earth filteraids for these purposes by means of acid washing either a natural, calcined, or flux-calcined earth. However, it is found in practice that it is difficult or impossible to reduce the total acid solubility values or iron soluble values to a sufficient or desired degree.

It is an object of the invention to provide an improved process for the treatment of diatomaceous earth and related materials.

It is a further object of the invention to provide an improved process for the manufacture of premium diatomaceous earth products useful as filteraids and fillers from earth deposits heretofore considered to be of poor quality.

It is a further object of the invention to provide an improved diatomaceous earth filteraid having water and acid solubility values considerably improved over present or prior commercial diatomaceous earth products.

It is a further object of the invention to provide a novel method for the manufacture of diatomaceous earth filteraids of improved purity.

It is a further object of the invention to substantially reduce the iron and aluminum values of diatomaceous earth over and above what has been accomplished heretofore.

The above objects as well as others which will become apparent upon a complete understanding of the invention as herein described are accomplished by calcining a composition comprising essentially diatomaceous earth together with at least one agent of the group consisting of the oxy acids of phosphorus and their anhydrides, ammonium salts and alkali metal salts. The resulting flux-calcined product is acid washed with one or more acids which effect a solution or leaching of the acid-soluble components produced in the flux-calcined product; this can be accomplished by dispersing the flux-calcined product in a solvent for said acid-soluble products such as an aqueous solution of acid, followed by heating and agitating the resulting mixture for a time sufficient to extract the acid-soluble values from the product. The acid treated material is then washed to remove substantially all of the free acid and other water-soluble materials which may remain as a residue in the acid treated product. Following this the product is dried to remove substantially all of the water or other solvent employed in the washing operation. Occasionally it is observed that the dried product contains some agglomerated material which may be broken up by any suitable comminution operation such as by milling in a Raymond or Grundler mill or in a fan type blower. It will be obvious to those skilled in the art that this milling should be sufficient to disintegrate or break down the agglomerated product without substantially disturbing or destroying the diatom structure of the earth.

I have found that agents in the aforementioned class of fluxing agents as well as mixtures thereof are particularly suitable for the flux calcination of diatomaceous earth and related materials and can be used in large amounts to produce calcined materials substantially free from sintered particles. Furthermore, I have found that these agents can be used to accomplish the flux calcination of diatomaceous earth and related materials and can be used to accomplish the flux calcination of diatomaceous earth containing impurities in large amounts which earths heretofore have been discarded as unsuitable for the production of flux calcined diatomaceous earth materials of premium whiteness. More particularly, I have found that diatomaceous earths which contain compounds of iron and aluminum (calculated as oxides) in excess of about 3 and about 5%, respectively, may now be flux calcined to provide products having a degree of whiteness comparable to conventionally flux calcined diatomaceous earths containing considerably smaller quantities of these impurities. My discovery has therefore made available to the diatomaceous earth industry the utilization of extensive deposits of diatomaceous earth which heretofore have been deemed useless or undesirable for the manufacture of calcined diatomaceous earth products of good whiteness. My discovery has also made available to the diatomaceous earth industry a filteraid having a very small quantity of acid-soluble iron values, i. e., less than 0.02 per cent, calculated as $Fe_2O_3$. When operating in accordance with my invention it is also possible to produce diatomaceous earth filteraids of a high degree of purity and low solubility in water and acids, said product having an $R_2O_3$ and $Fe_2O_3$ acid solubility of less than 0.2 and 0.02 per cent, respectively.

In a broad embodiment of the invention diatomaceous earth, preferably in a comminuted state, is admixed with at least one agent of the group consisting of the oxy acids of phosphorus and their anhydrides, ammonium salts and alkali metal salts. The resulting mixture is heated to a temperature at which the diatomaceous earth whitens. This temperature will vary depending upon the amount and chemical composition of the impurities, but in general will be within the range of about 1000° F. to below the sintering point of the mixture, the latter being considerably higher than the temperature required for whitening. Temperatures in excess of 2200° F. are seldom required. The mixture is heated, preferably within the aforementioned temperature range, for a period of time sufficient to effect the desired whitening, this period depending mainly upon the temperature employed and amount and nature of the impurities. The quantity of agent employed in the flux calcination will usually be between about 5 and about 70% by weight, and preferably between about 10 and about 60% by weight of the diatomaceous earth, or between about one and about four parts by weight per part of the iron and aluminum impurities. The quantity of agent employed will depend upon the amount and chemical nature of the impurities present in the diatomaceous earth desired to be whitened. In another embodiment of the invention the flux calcined product is then acid treated, preferably with a mineral acid in aqueous solution such as sulfuric, phosphoric, hydrochloric and nitric acids or in other acidic solutions or solvents which will solubilize or leach out the acid-soluble values from the flux-calcined product. The acid treated material is then preferably washed free from any excess acid or solvent after which it is dried and milled to produce a filteraid having excellent clarification properties and which will contain less than 0.02 per cent of iron soluble values (as $Fe_2O_3$) and which will also be low in water and acid solubility.

In a specific embodiment of the invention, a diatomaceous earth having an iron content (calculated as $Fe_2O_3$) higher than about 3% by weight is heated in the presence of between about 5 and about 60% by weight of ortho-phosphoric acid employing a sufficient amount of water to substantially uniformly distribute the acid over the diatomaceous earth silica particles. The resulting mixture is then heated in a rotating kiln maintained at a temperature between about 2000° and about 2600° F. the actual temperature of the mixture being between about 1500° and about 2000° F. The residence time of the mixture in the kiln may vary between about thirty minutes and about two hours. The resulting diatomaceous earth product has a whiteness comparable to a diatomaceous earth calcined with soda ash which earth has an iron content (calculated as $Fe_2O_3$) of about 1% by weight. Furthermore, the product is found to be substantially free from sintered material and when employed as a filtration agent will have a cake density, flow rate and clarifying power equal to that of the best known, conventionally calcined diatomaceous earth filteraids. The flux-calcined product is dispersed and/or suspended in an aqueous solution of sulphuric acid (2–75% by weight $H_2SO_4$), and the mixture is agitated at temperatures from about 70–230° F., for a period of time which may vary from 15 minutes to several hours, depending upon the temperature and acid concentration. The acidic aqueous phase of the mixture is removed by filtration, decantation or centrifugation and the resulting solid product is washed repeatedly with water until the washings are substantially neutral. The product is then dried at a temperature of about 212–250° F. to constant weight after which it is milled in a Grundler or Raymond mill, or high speed fan blower to break up any agglomerated material, the milling conditions not being so severe so as to break up, disrupt or destroy the diatom structure of the filteraid.

In addition to orthophosphoric acid as illustrated above, I may employ other oxy acids of phosphorus such as meta- and pyro-phosphoric acid, hypophosphoric acid and ortho-, pyro-, and hypo-phosphorus acids. While these acids may be admixed with the diatomaceous earth in a substantially anhydrous or hydrated condition, the preferable procedure is to add enough water to the acid or to the mixture of the acid and the diatomaceous earth to facilitate a uniform distribution of the agent throughout the diatomaceous earth and assure a more uniform final product.

As mentioned above a variety of acids or acidic materials may be employed to dissolve, attack or leach out the acid soluble values present in the flux-calcined product. Sulfuric acid may be employed in concentrations from 2–75% by weight, hydrochloric acid in concentrations of 2–36% by weight, nitric acids in concentrations of 2–70% by weight, phosphoric acids in concentrations of 2–70% by weight.

The temperature of acid treatment may vary from room temperature to about 250° F. depending upon particular requirements. While it is possible to use acidic material in an amount only sufficient to remove the acid soluble values from the flux-calcined product, in commercial practice it will be preferable to employ an excess of acid in order to accelerate this step of the process. It will be obvious to those skilled in the art that when excess acid is employed, any such excess should be removed from the product prior to drying since it is desirable to reduce to a minimum the amount of acid soluble or water soluble material in the ultimate product.

In a further embodiment of the invention, a mixture of phosphorus and an oxygen-containing gas such as air, or mixtures of oxygen with inert gases and combustion gases may be admixed with a diatomaceous earth, either in an anhydrous atmosphere or in the presence of water or steam, at a temperature between about 1500° and about 2500° F. The oxygen content of the gas is so regulated that an anhydride of an oxy acid of phosphorus is formed such as $P_2O_3$, $P_2O_4$, $P_2O_5$ or mixtures thereof. The resulting diatomaceous earth material is comparable in quality to that produced when employing an oxy acid of phosphorus as hereinabove described. The resulting product is then washed with excess aqueous hydrochloric or sulfuric acids to remove acid soluble values after which the product is washed free of acid, dried, etc. as described above.

In a further embodiment of the invention, diatomaceous earth containing substantial quantities of impurities, particularly iron and aluminum compounds, is admixed with an alkali metal salt of an oxy acid of phosphorus, for example, the sodium and potassium salts of the acids previously set forth herein. Alternatively, the corresponding ammonium salts may be employed. The salts in solid form may be intimately admixed with the diatomaceous earth but preferably will be dissolved in water or other suitable solvent and the resulting solution admixed with the earth in order to uniformly coat the particles. The resulting mixture is then heated in a stationary bed or in a rotating kiln or in a fluidized system within the above mentioned temperature range to produce diatomaceous earth products substantially free from sintered material and having excellent flow rate and clarifying powers. The flux-calcined product is then acid washed, dried and milled as described herein.

In a further embodiment, mixtures of the reagents previously mentioned herein may be employed, for example mixtures of orthophosphoric acid and sodium metaphosphate, orthophosphoric acid and $P_2O_5$, pyrophosphoric acid and trisodium phosphate $$(Na_3PO_4.12H_2O)$$

etc.

I have also discovered that in some instances it may be advantageous to employ a mixture of one or more of the agents previously mentioned herein together with an agent heretofore employed in the conventional flux calcination of diatomaceous earth. For example, I may employ a mixture of orthophosphoric acid and sodium carbonate, mixtures of pyrophosphoric acid and sodium chloride, mixtures of metaphosphoric acid, sodium carbonate and sodium bicarbonate. In such cases the amount of conventional agent is preferably in minor proportion to that of the agents which I employ in my novel process. I have found that the sintering of diatomaceous earth and related materials normally caused by large amounts of conventional fluxing agents is minimized or substantially eliminated by employing, in addition, substantial quantities of the phosphorus containing agents hereinbefore set forth.

The purity of analytical grade diatomaceous earth filteraid with respect to water and acid solubility is measured by means of certain prescribed tests. Total acid solubility and acid-soluble iron (as $Fe_2O_3$) is determined in the same test.

The per cent total acid solubility and iron solubility values of a filteraid are determined by the following tests:

To a 2.000 gram sample of dry material in a 250 ml. beaker add 100 ml. of hot sulfuric acid (1.3 sp. gr.). Heat without stirring for one hour on a water bath at 204° F. Filter through a weighed Gooch crucible and wash acid-free with hot water. The filtrate is reserved for determination of acid-soluble iron (as $Fe_2O_3$). Dry the crucible plus sample at 220° F. to constant weight. Per cent total acid solubility=100—percent insoluble.

Dilute the filtrate to 500 ml. Place a 10 ml. aliquot of the diluted filtrate in a 100 ml. Nessler tube. Add dilute potassium permanganate until a faint pink color remains. Add 5 ml. of 20% potassium thiocyanate solution. Dilute to 100 ml. and compare to a similarly prepared standard, i. e., to 10 ml. of similarly diluted acid (1 part 1.3 sp. gr. sulfuric acid diluted with water to 5 parts) in a Nessler tube, and the same reagents as above. To this standard add sufficient standard iron solution until the tubes have identical colors.

The water solubility of an analytical grade diatomaceous earth filteraid is determined as follows: A 2.000 gram sample is boiled for 30 minutes with 150 ml. of distilled water. The resulting suspension is filtered and the isolated product washed thoroughly with hot distilled water. The washed product is dried to constant weight at 221°–230° F.

$$\text{Per cent insoluble} = \frac{\text{Weight of dried sample}}{2 \times 100}$$

Per cent soluble = 100 — per cent insoluble

Acid soluble $R_2O_3$ reports only the $R_2O_3$ that is soluble in dilute hydrochloric acid (i. e. $Fe_2O_3$, $Al_2O_3$, $TiO_2$, $P_2O_5$). The standard test is as follows:

To a 1.000 gram sample add 250 ml. of distilled water and 25 ml. of concentrated hydrochloric acid (35–36% HCl). Boil for 30 minutes and filter; wash three times with hot water. Retain all filtrate and washings to which add two drops of nitric acid and a small amount of paper pulp. Heat to boiling and add sufficient ammonium hydroxide to neutralize the solution using methyl red indicator. Bring the solution to boiling and allow precipitate to settle. Filter off precipitate using No. 40 filter paper and wash it five times with hot distilled water. Transfer the filter paper and contents to an ignited and weighed crucible; ignite carefully until paper is charred, then over full flame or in furnaces until carbon free.

$$\frac{\text{Weight of precipitate} \times 10.000}{100 - \text{percent moisture}} =$$

percent acid soluble $R_2O_3$

The color standard employed in reporting the results of the following examples were prepared by mixing in various proportions of a very white diatomaceous earth (Standard B) and one of a visually perceptible pinkish shade (Standard J). The proportions in which these materials are blended and the General Electric brightness of the blends are shown in the following table:

TABLE I

*Color standards*

| Standard | Percent B Standard | Percent J Standard | G. E. Brightness |
|---|---|---|---|
| A | (¹) 100.0 | (¹) 0 | (¹) 92.4 |
| B | 87.5 | 12.5 | 87.6 |
| C | 75.0 | 25.0 | 84.7 |
| D | 62.5 | 37.5 | 82.4 |
| E | 50.0 | 50.0 | 80.2 |
| F | 37.5 | 62.5 | 78.5 |
| G | 25.0 | 75.0 | 76.8 |
| H | 12.5 | 87.5 | 75.1 |
| I | 0 | 100.0 | 73.4 |
| J | | | |

¹ Artificial magnesium silicate.

The following examples are illustrative of the prior art practice employed in the preparation of so-called analytical grade diatomaceous earth filteraids. In these tests comminuted diatomaceous earth samples (50 gm. each) were dispersed in an excess of aqueous mineral acid, and the mixture digested for 25 minutes at the indicated temperature. The experiment technique employed and the per cent $R_2O_3$ acid solubility is reported in the following table:

TABLE II

| Example No. | 1 | 2 | 3 | 4 |
|---|---|---|---|---|
| Acid Used | $H_2SO_4$ | HCl | $HNO_3$ | HCl |
| Concentration (wt. Percent) | 25 | 18 | 18 | 18 |
| Volume Used (Ml.) | 300 | 300 | 300 | 300 |
| Contact Temp., ° F | 153 | 153 | 207 | 207 |
| No. Digestions | 1 | 1 | 1 | 2 |
| Percent $Fe_2O_3$ | 0.6 | 0.5 | 0.4 | 0.2 |
| Percent $R_2O_3$ (dried product) | 1.8 | 1.6 | 1.1 | 0.6 |
| Percent $R_2O_3$ (Calcined product 1,700° F.) | 0.8 | 0.6 | 0.4 | 0.3 |
| Percent Water Soluble | 2.6 | 2.6 | 2.7 | 2.6 |
| G. E. Brightness | 89 | 88 | 90 | 81 |

In order to more fully illustrate the nature and character of the present invention, but without being limited thereby, the following examples are set forth wherein 100 grams of various diatomaceous earths containing impurities (calculated as metal oxides) are treated with various fluxing agents. The conditions for acid treatment and washing of the acid treated product are self-explanatory.

The crude diatomaceous earth employed in Examples 5 and 6 had the following analysis Percent by weight
Total acid sol. (in $H_2SO_4$) _____ 7.6
Acid sol. $Fe_2O_3$ _____ 1.6
Acid sol. $R_2O_3$ (in HCl) _____ 5.3

This material was mixed with sufficient aqueous orthophosphoric acid (12 per cent by weight $H_3PO_4$) to wet the sample which was then calcined in a muffle furnace maintained at a temperature of about 1700° F. The product was then slurried with 600 ml. of acid of the type and under the conditions indicated in Table III. The various acid treated products were washed several times with water until the excess acid had been removed. The resulting products were then dried at a temperature of 220–228° F. to a constant weight.

TABLE III

| Example No. | 5 | 6 |
| --- | --- | --- |
| Acid Used | H₂SO₄ | HCl |
| Concentration (Percent by wt.) | 25 | 13 |
| Contact Time, Min | 25 | 25 |
| Contact Temp., °F | 203 | 203 |
| Temp. of Water Rinse, °F | 70 | 70 |
| Acid Sol., R₂O₃ Percent | 0.49 | 0.37 |
| Acid Sol., Fe₂O₃ Percent | 0.025 | 0.03 |
| Acid Sol., Total Percent | 0.85 | 0.91 |
| G. E. Brightness | 88 | 85.7 |

In the following examples diatomaceous earth crude having the following analysis:

|   | Percent by weight |
| --- | --- |
| Total acid sol. (in $H_2SO_4$) | 5.4 |
| Acid sol. $Fe_2O_3$ | 0.9 |
| Acid sol. $R_2O_3$ (in HCl) | 4.5 | was flux calcined with sodium phosphate ($NaPO_3$), 10% by weight, at a temperature of about 1800° F. and for a time of about fifty minutes. The flux-calcined product was then slurried with 600 ml. of acid of the type and under the conditions indicated below in Table IV. The various acid treated products were washed several times with water until the excess acid had been removed. The resulting products were then dried at 220–257° F. to constant weight.

TABLE IV

| Example No. | 7 | 8 | 9 | 10 | 11 | 12 | 13 |
| --- | --- | --- | --- | --- | --- | --- | --- |
| Acid Used | HCl | H₂SO₄ | H₂SO₄ | H₂SO₄ | H₂SO₄ | H₂SO₄ | H₂SO₄ |
| Concentration (percent by wt.) | 19 | 60 | 25 | 25 | 25 | 25 | 25 |
| Contact Time, Min | 25 | 25 | 25 | 25 | 25 | 25 | 25 |
| Contact Temp., °F | 203 | 203 | 203 | 203 | 203 | 203 | 203 |
| Temp. of Rinse, °F | 70 | 70 | 70 | 70 | 70 | 70 | 212 |
| Acid Sol., R₂O₃ Percent | 0.2 | 0.1 | 0.3 | 0.16 | 0.18 | 0.13 | 0.13 |
| Acid Sol., Fe₂O₃ Percent | 0.03 | 0.025 | 0.025 | 0.025 | 0.005 | 0.01 | 0.01 |
| Acid Sol., Total Percent | 0.90 | 0.90 | 0.97 | 0.66 | 0.5 | 0.6 | 0.5 |
| G. E. Brightness | 90 | 92 | 91 | 90 | 91.5 | 93.5 | 93.5 |

The average water solubility of products in Examples 5–13 (as determined by the test previously described herein) averaged 1.0–1.2 per cent by weight, whereas the water solubility of the so-called analytical grade filter aids of the prior art (as described in Table I) averaged between 2.2–2.5 per cent by weight. I have also observed that the flow rate of the filter aids prepared according to the present invention are substantially improved over the flow rate of the prior art analytical grade filter aids, the former averaging 95–100 and the latter 70–80 as determined by conducting a standard filtration operation with a 60° Brix sugar solution. In addition, the total acid solubility of my novel filter aid products average between about 0.75 and 1.2% by weight while the prior art products average about 1.8 and 2.0 per cent by weight.

In addition to the flux-calcined diatomaceous earth products prepared by employing phosphoric acid and sodium metaphosphate (as exemplified above) corresponding products were prepared by flux-calcination with various oxy acids of phosphorus, their anhydrides, ammonium salts, and alkali metal salts.

The flux-calcined products described herein are substantially free from sintered material and the use of such agents apparently solubilizes or makes more available to acidic solutions the $R_2O_3$ values present in the original earth than do the methods illustrated by the prior art.

The novel products of the process herein described have flow rate and clarity characteristics somewhat better than those produced by calcining the same earth with sodium carbonate, silicate or chloride, but the principal improvement in quality lies in the absence of sintering, hardening and shrinkage which are compatible with bleaching to a high degree of whiteness.

While the above examples illustrate flux-calcination by means of a muffle furnace wherein the temperature is carefully regulated, it is to be understood that the invention is not limited to such an operation nor to the particular reagents described.

It is within the scope of the invention to conduct the calcining operation in a rotating kiln, shaft furnace or in a fluidized system whereby mixtures of diatomaceous earth and the agents contemplated herein are reacted at appropriate temperatures.

Various modifications of the techniques set forth herein will occur to those skilled in the art. For example, conventional practice usually contemplates a pre-drying operation carried out on the milled crude diatomaceous earth in a zone maintained at a temperature of about 400–500° F. The calcined material is subsequently classified to remove particles of high density and large size. The desired product may be used directly as a filter aid or filler in many commercial operations or may be further calcined with or without a conventional agent at a temperature between about 1800° to 2100° F. The fluxing agents contemplated by my novel process can be added to the diatomaceous earth prior to the milling and drying operation or prior to or subsequent to the calcining step if desired. Furthermore, it is also within the scope of the invention to conduct a flux calcining operation wherein the fluxing agents are added to a conventionally flux-calcined diatomaceous earth to further whiten the same. This is particularly desirable when large stocks of flux-calcined diatomaceous earth are available which cannot be whitened by further addition of conventional fluxing agents such as sodium chloride, soda ash, etc. without further increasing the degree of sintering of the earth.

Having thus fully described the nature and character of this invention, what is desired to be secured by Letters Patent is:

1. A method for preparing a diatomaceous earth filter-aid of low solubility in water or acids which comprises calcining at a temperature above about 1000° F., a mixture of diatomaceous earth containing substantial amounts of iron and aluminum impurities with at least one agent of the group consisting of the oxy acids of phosphorus and their anhydrides, ammonium salts and alkali metal salts, said agent being present in an amount between about 1 and about 4 parts by weight of the iron and aluminum impurities originally present in said earth, and acid washing the resulting product to remove acid-soluble values therefrom.

2. A process according to claim 1 wherein the agent in the flux-calcining operation is ortho-phosphoric acid.

3. A process according to claim 2 wherein the agent in the flux-calcining operation is sodium metaphosphate.

4. A method for preparing a diatomaceous earth filteraid of low solubility in water or acids which comprises calcining at a temperature above about 1000° F. a comminuted diatomaceous earth containing substantial amounts of iron and aluminum impurities with at least one agent of the group consisting of the oxy acids of phosphorus and their anhydrides, ammonium salts and alkali metal salts, said agent being present in an amount between about 1 and about 4 parts by weight of the iron and aluminum impurities originally present in said earth, acid washing the resulting product to remove acid-soluble values therefrom, removing excess acid from the resulting acid treated product, drying the substantially acid-free material and milling it to break up any agglomerates formed during said drying operation.

5. A process according to claim 4 wherein the agent employed for flux-calcination is ortho-phosphoric acid.

6. A method according to claim 4 wherein the agent employed for flux calcination is ortho-phosphoric acid, and the acid employed for treating the flux-calcined product is sulfuric acid.

7. A method for preparing a diatomaceous earth filteraid of low solubility in water or acids which comprises calcining at temperatures above about 1000° F. a comminuted diatomaceous earth containing substantial amounts of iron and aluminum impurities with at least one agent of the group consisting of the oxy acids of phosphorus and their anhydrides, ammonium salts and alkali metal salts, said agent being present in an amount between about 1 and about 4 parts by weight of the iron and aluminum impurities originally present in said earth, acid washing the resulting product with an acid of the group consisting of sulfuric, hydrochloric, phosphoric and nitric acids to remove acid-soluble values from the calcined product, removing excess acid from the resulting mixture and drying and milling the resulting product.

8. A method for preparing a diatomaceous earth filteraid of low solubility in water or acids which comprises calcining at a temperature above about 1500° F. a comminuted diatomaceous earth containing substantial amounts of iron and aluminum impurities with at least one agent of the group consisting of the oxy acids of phosphorus and their anhydrides, ammonium salts and alkali metal salts, said agent being present in an amount between about 1 and about 4 parts by weight of the iron and aluminum impurities originally present in said earth, acid washing the resulting product to remove acid-soluble values therefrom, removing excess acid from the resulting acid treated product, drying the substantially acid-free material and milling it to break up any agglomerates formed during said drying operation.

9. A method according to claim 8 wherein the mixture of diatomaceous earth and calcination agent is heated to a temperature between 1500° to 2000° F.

10. A process for whitening diatomaceous earth containing as major impurities compounds of iron and aluminum which comprises calcining at a temperature above about 1000° F. a mixture of said earth and at least one agent of the group consisting of the oxy acids of phosphorus and their anhydrides, ammonium salts and alkali metal salts, said agent being present in an amount between about 1 and about 4 parts by weight per part of said impurities.

11. A process according to claim 10 wherein the agent is orthophosphoric acid.

12. A process according to claim 10 wherein the agent is sodium metaphosphate.

13. A process for whitening diatomaceous earth containing as major impurities compounds of iron and aluminum which comprises calcining at a temperature between about 1500° and about 2000° F. a mixture of comminuted diatomaceous earth and at least one agent of the group consisting of the oxy acids of phosphorus and their anhydrides, ammonium salts and alkali metal salts.

References Cited in the file of this patent

UNITED STATES PATENTS

| Number | Name | Date |
|---|---|---|
| 1,502,547 | Calvert et al. | July 22, 1924 |
| 1,992,547 | Schuetz | Feb. 26, 1935 |
| 2,120,702 | Ipatieff et al. | June 14, 1938 |
| 2,283,174 | Bates | May 19, 1942 |
| 2,381,481 | Anderson | Aug. 7, 1945 |
| 2,466,049 | Shabaker et al. | Apr. 5, 1949 |
| 2,575,457 | Mavity | Nov. 20, 1951 |